United States Patent [19]

Hamlin et al.

[11] 4,247,331

[45] Jan. 27, 1981

[54] METHOD FOR PRODUCING AND STORING SAND COATED WITH CALCIUM CHLORIDE

[75] Inventors: Richard S. Hamlin, South Lyon; Wayne L. Higgins, Walled Lake, both of Mich.

[73] Assignee: South Lyon Trucking Company, Inc., Brighton, Mich.

[21] Appl. No.: 948,706

[22] Filed: Oct. 5, 1978

[51] Int. Cl.³ .............................................. C09K 3/18
[52] U.S. Cl. ...................................... 106/13; 252/70; 414/133; 427/215
[58] Field of Search .................. 106/13; 427/212, 215; 252/70; 118/303; 414/133

[56] References Cited

U.S. PATENT DOCUMENTS

| | | | |
|---|---|---|---|
| 1,576,888 | 3/1926 | Woodward | 264/DIG. 43 |
| 1,902,419 | 3/1933 | Plant et al. | 106/38.9 |
| 1,931,754 | 10/1933 | Denning | 427/218 |
| 2,308,289 | 1/1943 | Lawrence | 252/70 |
| 2,410,910 | 11/1946 | Wait | 252/70 |
| 3,989,870 | 11/1976 | Bocks et al. | 428/315 |
| 4,060,439 | 11/1977 | Rosemund et al. | 156/78 |

Primary Examiner—Lorenzo B. Hayes
Attorney, Agent, or Firm—Basile, Weintraub & Hanlon

[57] ABSTRACT

A method of storing sand coated with calcium chloride is disclosed which method comprises covering the sand with a plastic sheet which is then coated with a layer of plastic foam to protect the sand from moisture and to keep the cover in place.

5 Claims, 2 Drawing Figures

METHOD FOR PRODUCING AND STORING SAND COATED WITH CALCIUM CHLORIDE

BACKGROUND OF THE INVENTION

I. Field of the Invention

The present invention relates to the field of treating ice covered roads during winter to produce improved traction and in particular the field of using calcium chloride coated sand to improve road surface traction when covered with ice.

II. Prior Art Statement

A number of methods are known for the coating of sand particles with various materials. U.S. Pat. No. 2,806,254 discloses a method for independently covering particles with a composition. U.S. Pat. No. 1,792,058 discloses a method of making colored granules by treatment with water or a coloring agent. Other U.S. patents the inventor has studied are: U.S. Pat. Nos. 4,053,545; 4,060,439; 3,983,294; 3,989,275; and 3,989,870. The inventor knows of no method presently published or patented that uses the method of the present invention to coat sand granules with calcium chloride and store them in an outdoor environment in a manner that would keep them suitable for application on icy highways over a long period of time. Further, the inventor knows of no fully portable device for coating sand with calcium chloride in an in situ manner.

SUMMARY OF THE INVENTION

The present invention comprises an in situ method of producing and storing sand coated with calcium chloride. The sand is coated in the following manner. The sand is loaded into a hopper atop a feeder. The feeder feeds the sand into a course material washer. While passing through the washer, the sand is coated and mixed with a solution of 33% calcium chloride and 67% water by weight. The coated sand is conveyed to a scale where it is weighed and the flow rate of the calcium chloride solution is adjusted in proportion to the weight of the sand. The sand is then piled on the ground for storage. The coated sand is covered with a plastic sheet having at least one side that is rough in texture. If only one side of the sheet is rough, the sheet is layed over the sand with the rough side outward. The plastic sheet protects the sand from having the calcium chloride washed away when exposed to rain or snow or a combination thereof and the stored sand remains in its original condition until ready for use. To protect the plastic sheet from deterioration and to keep it from blowing off in the wind, a coating of polyurethane foam is sprayed over the plastic to produce a protective blanket.

The machinery for coating sand granules is mounted on a semi trailer truck bed in such a manner that it can be transported over public roads. When arriving at a new site the machinery is in a condition that requires only a short time to set up and begin producing calcium chloride coated granules.

Other objects, advantages and applications of the present invention will become apparent to those skilled in the art of the instant invention when the accompanying description of one example of the best mode contemplated for practicing the invention is read in conjunction with the accompanying drawing.

BRIEF DESCRIPTION OF THE DRAWINGS

The description herein refers to the accompanying drawings wherein like reference numbers refer to like parts throughout the several views and wherein.

DESCRIPTION OF THE PREFERRED EMBODIMENT

Figure 1:
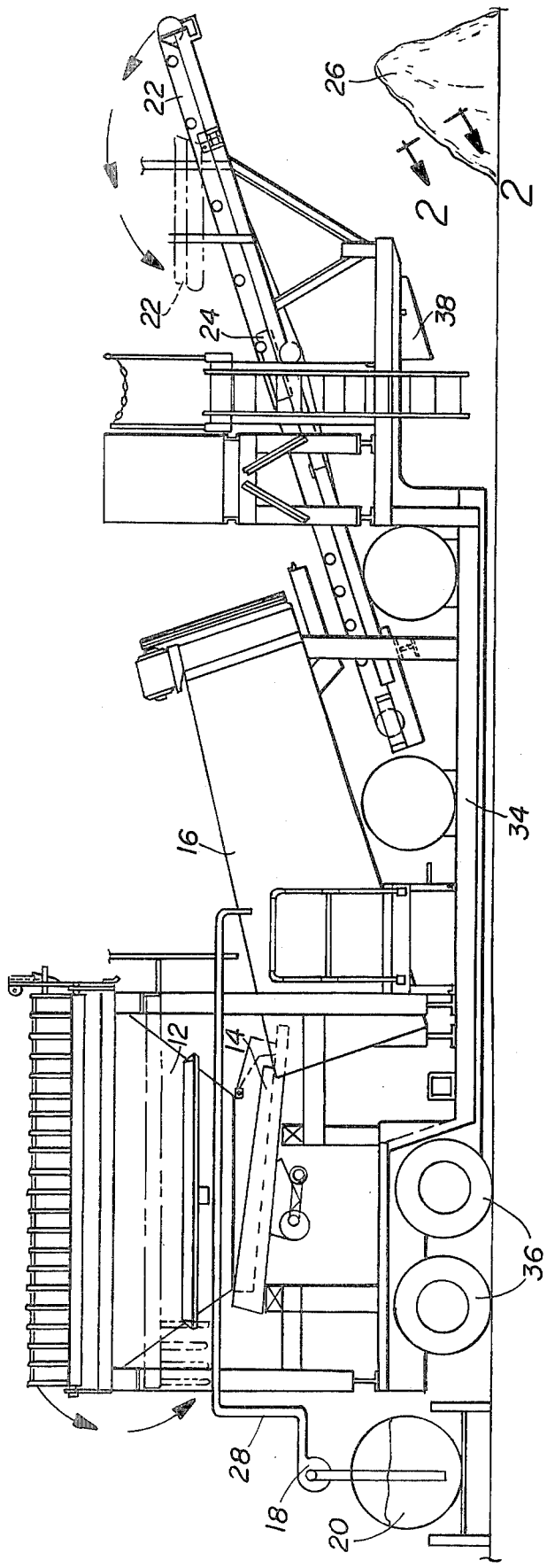
FIG. 1 illustrates schematically the device used for coating the sand in the instant invention.

Referring, now, to the drawing and in particular to FIG. 1 wherein there is illustrated the device for coating sand particles with calcium chloride used in the preferred embodiment of the present invention.

The preferred sand specification is as follows: 0 for 100% passing a ⅜ inch seive, 95 for 100% passing a #4 seive, 65 for 95% passing a #8 seive, 20 for 55% passing a #30 seive and 0 rated 5% loss by washing. The sand is dumped into a hopper 12 where it passes into a feeder 14.

The feeder passes the sand into a washer 16 where the sand is mixed with a solution of 33% calcium chloride and 67% water by weight. A centrifugal pump 18 transfers the calcium chloride and water solution from a resevoir 20 to the washing unit 16 by means of a conduit 28. The calcium chloride and water solution is mixed into the sand at the rate of 15 gallons per ton. The coated sand is dumped onto a belt conveyor 22 where it is weighed and then conveyed to a pile 26 where it is stored on the ground. The resulting calcium chloride coated sand has a rating with a 3% calcium chloride add mixture. The conventional method for treating ice covered pavements has been to use rock salt. However, rock salt at 20° F. begins losing its effectiveness for melting and removing ice from pavement. Calcium chloride coated sand will work down to 50° F. below zero because the instant the sand is placed on the surface it immediately provides a traction effect and within 25 to 30 minutes the coated sand begins to penetrate the ice honeycombing to the point where it becomes frangible and can be bladed off to the dry pavement.

Figure 2:
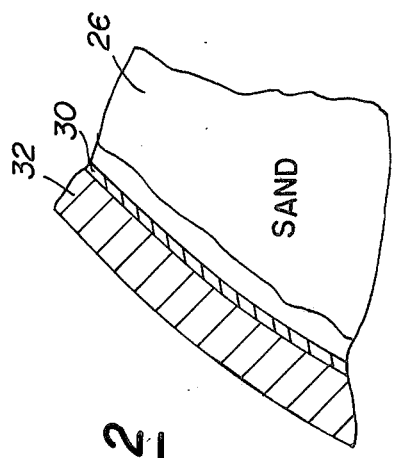
FIG. 2 illustrates a section through the covering of the sand in FIG. 1 taken along a section 2—2 of FIG. 1 greatly amplified.

Referring now to FIG. 2 there is illustrated a greatly magnified section through the covering, covering the pile of coated sand 26. A sheet of plastic material including polyvinyl chloride, polyvinyl, polyethylene, and coextruded polyethylene and ethoxilated vinyl acetate (EVA), 30 having a rough side facing outward is covered with a layer of polyurethane foam 32. The plastic sheet 30 can be rough on either one or both sides. However, if only one side is rough the rough side must face outward to provide a surface to which the foam can adhere. The rough side is produced by flame treating, chemical treatment or corona discharge.

The feeder 14, the washer 16 and the conveyor 22, along with the pump 18 and reservoir 20 are all electrically powered and are arranged to be quickly portable to the site where the sand is to be treated. A portable 85 KW generator (not shown) supplies the electrical power for the various componets shown in FIG. 1.

The feeder 14, the washer 16, the conveyor 22, the pump 18, and the reservoir 20 are installed on a semi trailer truck bed 34 having wheels 36 mounted on an axle (not shown) and fifth wheel attachment which is connectable to a tractor (not shown) for transportation to the site where the sand is to be coated and stored.

The upper or grizzly portion of the hopper 12 is foldable to the side to reduce the overall height of the device for transportation to a new site. The end of the conveyor 22 is foldable backward to reduce the overall length of the device for transport. The maximum height of the device when folded for transport is 13 feet six inches which allows it to clear bridges and overpasses on all major roads. The travel weight of the rig is 35 tons which allows transport over most roads during summer. The equipment is overwidth requiring a permit to travel and also requiring the precautions required by law during movement of the equipment.

For many years county and state highway departments have been mixing flake chloride and sand for ice control purposes. However, using this method the calcium chloride is not as thoroughly mixed with the sand and is not as effective.

It is preferable to produce the calcium chloride coated sand during the summer time when the weather is favorable and it is easy to excavate and transport the sand to the site where it is to be stored. However, rainy weather, snow, sleet, etc. can leach the calcium chloride away from the sand and render the admixture less effective. Therefore, in the present invention the preferred method for storing the coated sand is to cover it with a coating of thin sheet plastic such as polyvinyl chloride and spraying a coating of polyurethane foam over the plastic. This is effective in preventing the leaching away of the calcium chloride in rainy weather and the foam prevents deterioration of the plastic. The foam also prevents the plastic from blowing away in a high wind. Originally, plastic sheets that were smooth on both sides were used and it was found that the foam had a tendency to flake off and become ineffective over a period of time. The use of a rough plastic surface provides excellent adherence of the foam to the plastic sheet. The foam used can be either polyether urethane, polyester urethane or polystyrene applied in a conventional manner using commercially available foam spraying equipment.

Other materials or structures can be protected from moisture by using the method of covering the material with a plastic sheet having a rough side outward and then coating the sheet with a polyether urethane, polyester urethane, or polystyrene foam.

Having, thus described my invention, what we claim is:

1. A method for producing and storing sand coated with calcium chloride for treating ice covered highways comprising the steps of:
    (a) loading the sand into a hopper located over a feeder;
    (b) feeding and agitating the sand;
    (c) coating the agitating sand with a solution of calcium chloride and water;
    (d) conveying and weighing the coated sand;
    (e) piling the sand on the ground for storage;
    (f) covering the coated sand with a plastic sheet having a roughened outer surface; and
    (g) covering the roughened surface of said plastic sheet with a layer of polyurethane foam.

2. The method as defined in claim 1 wherein the plastic sheet is formed from a material selected from the group consisting of polyethylene, polyvinylchloride, coextruded polyvinylchloride and polyethelyne vinyl acetate, and mixtures thereof.

3. The method as defined in claim 1 including an additional step of metering and adjusting the flow of the calcium chloride and water solution in proportion to the weight of sand conveyed.

4. The method as defined in claim 1 wherein the foam is formed from a material selected from the group consisting of polyether urethane and polyester urethane.

5. The method of producing and storing sand coated with calcium chloride as defined in claim 1 wherein the solution of step (c) consists of 35% calcium chloride and 65% water by weight.

* * * * *